June 23, 1970  R. ADLER  3,516,729
CYLINDRICAL LENS COMPENSATION OF WIDE-APERTURE
BRAGG DIFFRACTION SCANNING CELL
Filed Aug. 3, 1965  2 Sheets—Sheet 1

$$\theta = \frac{\pi}{2} - \frac{\Theta}{2}$$

*INVENTOR.*
Robert Adler
BY
Attorney

June 23, 1970  R. ADLER  3,516,729
CYLINDRICAL LENS COMPENSATION OF WIDE-APERTURE
BRAGG DIFFRACTION SCANNING CELL
Filed Aug. 3, 1965  2 Sheets-Sheet 2

INVENTOR
Robert Adler
BY
Attorney

United States Patent Office 3,516,729
Patented June 23, 1970

3,516,729
CYLINDRICAL LENS COMPENSATION OF WIDE-APERTURE BRAGG DIFFRACTION SCANNING CELL
Robert Adler, Northfield, Ill., assignor to Zenith Radio Corporation, Chicago, Ill., a corporation of Delaware
Continuation-in-part of application Ser. No. 388,589, Aug. 10, 1964. This application Aug. 3, 1965, Ser. No. 476,797
Int. Cl. G02f 1/16; H04n 3/02
U.S. Cl. 350—161                           1 Claim

ABSTRACT OF THE DISCLOSURE

Greatly improved scanning resolution is obtained with a Bragg diffraction light-sound interaction cell for the special case of linear scanning, by using a wide-aperture light beam of a width corresponding to an acoustic wave transit time which is large relative to the time required to scan an individual picture element, and compensating for resultant astigmatic distortion by providing a cylindrical lens whose optical axis is orthogonal to the scanning plane.

---

This application is a continuation-in-part of my co-pending applicaiton Ser. No. 388,589, filed Aug. 10, 1964, now Pat. 3,431,504, issued Mar. 4, 1969, and assigned to the same assignee. As in that case, the present application pertains generally to signal translating apparatus and more particularly relates to systems and apparatus in which sound and light are caused to interact. As used herein, the terms "light" and "sound" are most general. That is, "light" embraces ordinarily visible electromagnetic waves as well as wave energy at wavelengths above or below the visible portion of the spectrum. The term "sound" also refers to propagating wave energy and includes not only that in the audible range but wave energy up to and including, for example, microwave frequencies.

In the aforementioned parent application, light waves are caused to be diffracted by sound waves, as a result of which the light waves are deflected to a particular angle or angles depending upon the frequency characteristics of the sound waves. The sound waves are modulated either in amplitude or frequency depending upon the particular application. One advantageous embodiment described in the parent application projects the sound wave-fronts across the light wave-fronts so that the angle therebetween is in accordance with the relationship of Bragg. With that angular relationship, the traveling sound waves act as if they were traveling mirrors and, for a given frequency relationship, the angles of incidence and refraction of the light are the same as in the case with an ordinary mirror. With planar sound and light wave-fronts, usable Bragg angle reflection is attainable in that apparatus only over a limited range of sound frequencies without adjustment of the relative beam positions to maintain the Bragg relationship. In contemplation of scanning the sound frequency over a wider range of frequencies, the parent application specifically embodies means for physically changing the relative orientation of the elements with changes in sound frequency. In terms of resolution available with the apparatus of that application, limitations are found with respect to scanning speeds, practical ranges of needed sound frequencies and the maximum useful light beam aperture width.

It is a general object of the present invention to provide new and improved light-sound-interaction apparatus which permits the rapid scanning of a large number of resolvable points.

Another object of the present invention is to provide new and improved signal translating apparatus of the aforementioned character in which a wide light aperture width may be utilized without impairment of resolution.

It is a still further object of the present invention to achieve the foregoing with apparatus featuring ease and practicality of construction to meet varied operational requirements.

Signal translating apparatus in accordance with the present invention includes means for producing a beam containing waves of spatially coherent substantially monochromatic light together with means for directing sound waves across the path of the light beam with one sound wave-front traversing the width of the light beam in a predetermined time interval. Means are also included for repetitively scanning the frequency of the sound through a selected range of frequencies. The system further includes light refractive means enabling the aforesaid predetermined time interval to be a significant fraction of one scanning period.

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

Figure 1:
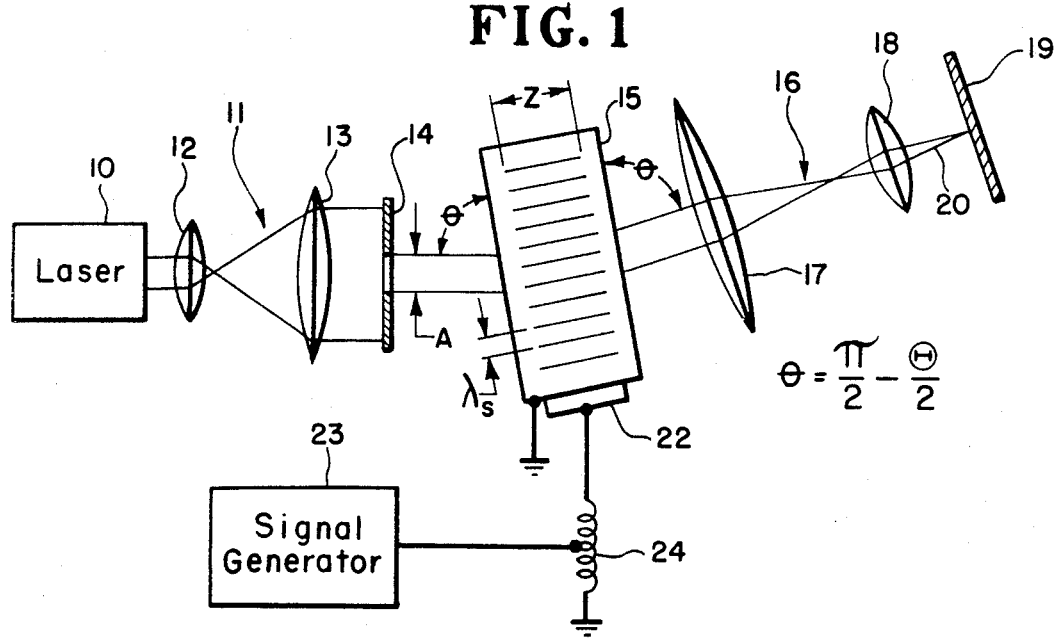
FIG. 1 is a schematic diagram of a light-sound signal translating apparatus.

The system in FIG. 1 is basically the same as that described and claimed in the parent application and is included here to facilitate an easier understanding of the improvements disclosed by the present application. The apparatus includes a source 10 preferably of spatially coherent substantially monochromatic light, a magnifying telescope 11 having an eye-piece 12 and an object lens 13, a beam-limiting aperture-plate 14 with an aperture width A, a light-sound interaction cell 15, and inverted telescope 16 having an object lens 17 and an eye-piece 18, and, in this illustration, a light-responsive screen 19 across which light beam 20 is caused to be scanned by the apparatus to be scanned.

In one example, cell 15 is a container the walls of which are transmissive to the light waves and which is filled with water as the sound propagating medium. At one end of cell 15, coupled to the water, is a transducer 22 driven by electrical signals from a signal generator 23 suitably matched to transducer 22 by a transformer 24. As illustrated, transducer 22 generates planar, constant wave-length, wave-fronts.

With the apparatus of FIG. 1, Bragg reflection is obtained when the light, of vacuum wavelength $\lambda$, travels in a stratified medium of spatial period $\Lambda$ between the stratifications and refractive coefficient $n$ through a path length Z such that:

$$Z \gg n\Lambda^2/\lambda \qquad (1)$$

The diffracted light forms a diffraction angle $\Theta$ with the undiffracted light according to:

$$\sin\frac{\Theta}{2} = \frac{1}{2}\frac{\lambda}{\Lambda} \qquad (2)$$

Where $\Theta$ is much less than 1, $$\Theta \cong \lambda/\Lambda$$

The Bragg angle may be defined in terms of the angle $\theta$ between the light and sound wave-fronts; in that case the function in Equation 2 is more directly expressed in terms of cosine rather than sine. Since $\theta$ is the complement $$\pi/2 - \Theta/2$$

the left-hand term in Equation 2 becomes $\cos\theta$. Angle $\theta$ is the angle between the propagation directions of the diffracted light and the sound beam. To obtain optimum intensity, the strata must be oriented like mirrors, symmetrical to the incident and diffracted light. However, that precise orientation effects only the intensity, not the direction of the diffracted light.

When the strata are generated by a sound wave of phase velocity $v$, the wavelength $\Lambda$ for an applied frequency $f$ is $\Lambda = v/f$ and the diffraction angle $$\Theta = \lambda f/v$$

If the sound frequency is varied over a range $\Delta f$, the resulting scanning angle is $$\Delta\Theta = \lambda(\Delta f)/v$$

The minimum angle which a projection system of aperture width A can resolve is $$\Theta_{min} = \lambda/A$$

Dividing the scanning angle $\Delta\Theta$ by this minimum angle, the number N of resolvable spots is found to be:

$$N = \Delta\Theta/\Theta_{min} = (\Delta f)A/v \qquad (3)$$

A is the aperture width measured at approximately right angles to the sound wave-fronts, i.e., along a direction of sound travel. It will be seen that $A/v$ is the transit time T of the sound waves across the aperture. Thus, $$N = (\Delta f)T \qquad (4)$$

With the development of constant-frequency planar sound wave-fronts in cell 15, optimum Bragg angle relationship is obtained by rotating cell 15 to the sound beam by $\frac{1}{2}\Delta\Theta$ ($\pm\frac{1}{4}\Delta\Theta$) as the diffracted light is scanned over the angle $\Delta\Theta$. To avoid the need for actual relative rotation, my copending application, Ser. No. 476,873, filed Aug. 3, 1965, and now Pat. 3,373,380 issued Mar. 12, 1968, assigned to the same assignee, discloses apparatus in which the sound wave-fronts are curved so that the tangents to the curve include a tangent which intersects the light wave-fronts at the appropriate Bragg angle.

To afford a better understanding of the parameters involved in typical systems of the kind being discussed, it will be instructive to briefly describe typical operating parameters. Still referring to the overall system of FIG. 1, the change of sound frequency $\Delta f$, is chosen to be $5 \times 10^6$ cycles-per-second and aperture width A is 22 millimeters. Since the sound velocity $v$ in water is $1.5 \times 10^6$ millimeters per second, the transit time is of the order of 14.7 microseconds and the number of resolvable points N in accordance with the foregoing relationship is approximately 73. The 1.5 millimeter beam from a helium-neon laser operating at 6328 A. is expanded to a width of about 30 millimeters by telescope 11 which has a magnification of 21. Aperture plate 14 allows a light beam width of 22 millimeters as the light enters cell 15. Transducer 22 is a quartz crystal 15 millimeters wide (making path length Z equal to 15 millimeters) and 3 millimeters high.

At the selected average or center frequency of 42.5 megacycles per second, the diffraction angle $\Theta$ is about 18 milliradians. Cell 15 is tilted by half this amount to obtain optimum Bragg reflection. In this arrangement, the selected parameters are $n=1.33$, $\Lambda=3.53\times 10^{-2}$ millimeters, and $\lambda=6.33\times 10^{-4}$ millimeters. Correspondingly, the value of $n\Lambda^2/\lambda$ is equal to 2.65 millimeters. A path length Z of 15 millimeters insures operation in the Bragg region. The electrical power applied at transducer 22 is 200 milliwatts; this is matched to the output of signal generator 23 by transformer 24 which is tuned in the range from 40 to 45 megacycles per second. The incident light is restricted by the rectangular aperture to 3 millimeters in height, so that no light can bypass the sound wave. The intensity of the diffracted light entering inverted telescope 16 is 8 db below that of the undiffracted light entering cell 15.

On leaving cell 15 the diffracted light projects through inverted telescope 16 which magnifies all angles 14.4 times. Consequently, the observed diffraction angle becomes $\Theta'$ which is of the order of 260 milliradians. Similarly, the scanning angle $\Delta\Theta$, which without inverted telescope is computed to be about 2.11 milliradians corresponding to a frequency change $\Delta f$ of 5 megacycles per second, is increased to a value of $\Delta\Theta'$ of 30.4 milliradians. Also by virtue of the inclusion of inverted telescope 16, the minimum resolvable angle is increased from $$\Theta_{min} = \lambda/A$$

of 0.029 milliradian to a value of 0.415 milliradian.

It may be noted also for purposes of background information that the attenuation in water of sound in the 40 megacycle range is about 0.5 db/millimeter, or 11 db across the 22 millimeter aperture in the above-described system. When a light beam of uniform intensity and semi-infinite width traverses a sound wave of exponentially decreasing amplitude, the resolution of the diffracted light equals that which would be obtained with zero sound attenuation and a uniformly illuminated aperture $A_{eq}$. Here, $A_{eq}$ is the distance in which the sound power is attenuated by $2\pi$ nepers (27 db). In that system, $A_{eq}$ is about 55 millimeters. Consequently, the resolution obtained is predominantly determined by the physical aperture. It is to be noted that a beam with a Gaussian intensity distribution suffers no loss of resolution. The effect of the exponential decay of sound amplitude across such a beam is merely that of displacing the center of the diffracted beam.

In another approach to the attainment of greater light beam deflection angles, as described in my copending application Ser. No. 476,798, filed Aug. 3, 1965, now Patent 3,419,322, issued Dec. 31, 1968, the sound waves are projected through a dispersive medium which causes the sound waves themselves to be diffracted at an angle which varies with change in the sound frequency. In one embodiment, a grating of spaced physical elements is utilized. It is constructed and oriented in a manner to redirect the sound waves with changes in frequency so as at least approximately to maintain the desired Bragg angle relationship between the sound waves and the light beam. That application also discloses arrangements for taking advantage of vibrational dispersion resulting in differences in angular relationships of sound propagating in various modes in different coupled media. The approaches yet to be described herein, may be employed either by themselves in apparatus exemplified by the system in FIG. 1 or, alternatively, may be utilized to augment the available beam deflection in systems such as those heretofore mentioned which use curvature of the wave-fronts or propagation of the sound through dispersive mediums.

In attempting to realize a scanning system as depicted in FIG. 1 which is to scan rapidly over a large number of resolvable points, one encounters a difficulty which, at first, appears to make the construction of such a system quite impractical. Because the frequency of the sound wave emanating from transducer 22 changes rapidly during the scan, it appears necessary to restrict the opening of aperture A severely. If this were not done, the aperture would contain sound waves of different wavelengths which would then diffract the light simultaneously into different directions. In order not to lose resolution, the aperture should therefore be small enough so that the transit time of the sound wave across it corresponds to the time in which a single resolvable element is scanned.

How severe this restriction is, is illustrated by using the numerical example previously referred to. The number of resolvable points N in that example was 73. Let it be assumed that all 73 points were to be scanned 15,000 times per second. The time available for each point is then 0.9 μsec.; a sound wave in water travels 1.35 mm. in that time, and the aperture A would thus have to be limited to 1.35 mm. instead of the 22 mm. described. Because, however, the number of resolvable points N equals the transit time T of the sound waves across the aperture multiplied by the range $\Delta f$ of sound frequency variation (Equation 4), the originally assumed number $N=73$ can be maintained, with the greatly reduced aperture, only if $\Delta f$ is increased from the original 5 mc./sec. to 82 mc./sec. In a system designed for a larger number N, the required frequency range $\Delta f$ would increase even further, greatly exceeding the capabilities of transducers and even the ability of a medium such as water to transmit sound at elevated frequencies.

According to the invention, it is possible to circumvent this difficulty and use a much larger aperture than one corresponding to the transit time for a single resolvable element, provided that the scan follows a linear law, so that the rate of change of the angle $\theta$ is constant with respect to time. In that case, if the aperture A is made wide, light diffracted at different points along the aperture emerges in different directions, but it has been found that these directions follow a simple law. Specifically, the effect of the linear distribution of sound frequencies which exists across the aperture at any given moment is equivalent to superposition upon the deflection produced at the center of the aperture of a simple optical cylinder lens, having a refractive power or inverse focal length of $$\frac{1}{F} = \frac{\lambda}{v^2} \frac{df}{dt} \quad (5)$$

where the $df/dt$ is the rate of change of the frequency applied to transducer 22. The cylinder lens effect can be removed if desired by a complementary lens. By utilizing these principles, the aperture A can be made so wide that the transit time T of a sound wave across A constitutes a significant fraction of the scan repetition period.

Figure 2:
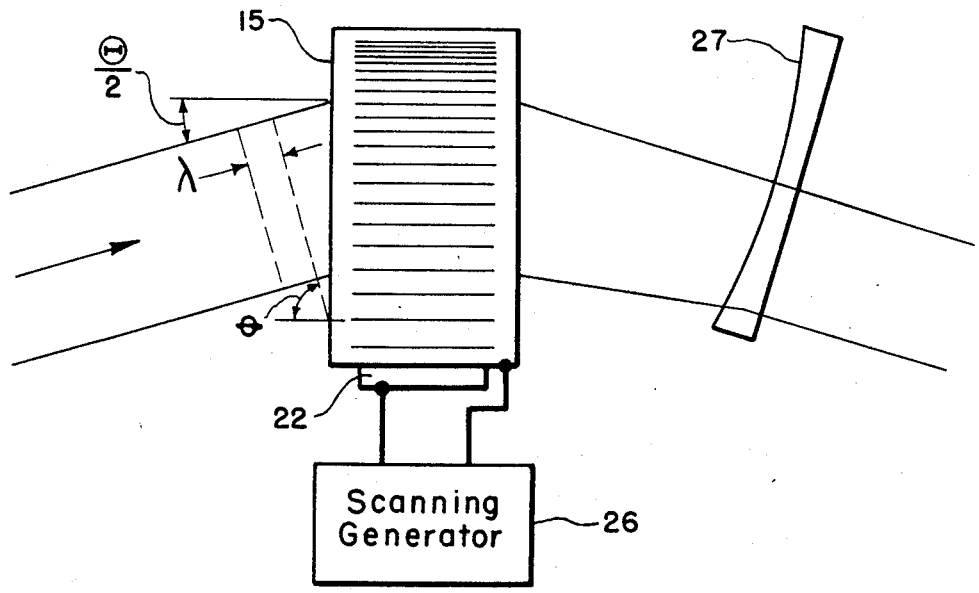
FIG. 2 is a schematic representation of an element utilized in FIG. 1 in accordance with an embodiment of the present invention.

FIG. 2 illustrates the modification of a portion of FIG. 1 in implementing the principles of the invention. The light beam aperture width is such that the transit time T of the sound across the beam is a significant fraction of the repetition period of the scanned acoustic signals fed from a scanning generator 26. The presence of the sound waves whose frequency, at any given moment, varies linearly across the aperture causes the diffracted light to converge or diverge as if it had passed through a cylindrical lens. The refractive power of this fictitious lens of cell 15 itself is proportional to the rate of change of frequency and thus stays constant throughout the linear scan. According to the invention, allowance is made for this refractive power by means of compensating optical elements which may be additionally included in or external to cell 15.

As illustrated in FIG. 2, the sound wavelength is increasing with the passage of time during a scanning period and the approaching light wavefronts encounter departing sound wave-fronts. Consequently, the light beam as it emerges from cell 15 converges astigmatically. This astigmatism is compensated by the imposition of a divergent cylindrical lens 27 in the emerging beam path. In practice, the cylindrically-divergent action of lens 27 may be included anywhere in the system, before, within or following cell 15.

To review the operation, the sound waves are directed across the light beam path in a manner such that one sound wave-front traverses the width of the light beam in a predetermined time interval. Scanning generator 26 repetitively scans the frequency of the sounds through a selected range of frequencies with the aforementioned predetermined transit time interval being a significant fraction of one scanning period. To render the refractive power of the effective lens of cell 15 itself constant throughout the scan, the frequency change during a scanning period is linear so that its rate of change is constant. With the arrangement in FIG. 2, the wave-fronts of the sound and light intersect approximately at the Bragg angle $\theta$ corresponding to the average sound and light frequencies. As indicated also in FIG. 2, the wavelength of the sound is small compared to the width of the light beam. Lens 27 as embodied is chosen so that its refractive power for the light is complementary to the refractive power of the sound waves. Alternatively, lens 27 may be selected to have a function of refraction with any desired relationship to the refractive function of cell 15 as determined by the scanning waveform.

A variety of different resulting beam deflection actions are available, depending upon the specific angular relationships and directions selected as illustrated in FIGS. 3-8. The particular result achieved depends upon whether the sound waves are advancing toward or departing from the arriving light waves. Another selectable parameter is in the choice between the use of a positive or negative Bragg angle, whether the light waves arrive from a direction from an angle to one side or the other of a normal to the direction of propogation of the sound waves. A still further choice lies between a scanning waveform which increases in frequency with time or one the frequency of which decreases with time during the scanning period.

Figure 3:
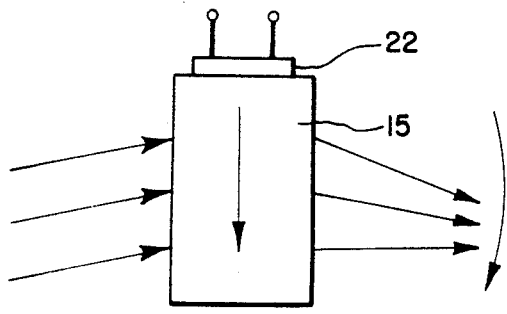
FIGS. 3, 5, 6 and 8 depict schematically various operational relationships with respect to the principal element depicted in FIG. 2.
Figure 5:
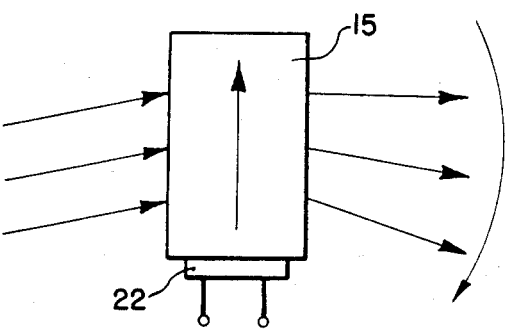
Figure 4:
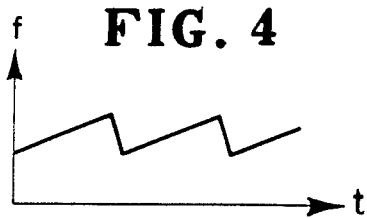
FIGS. 4 and 7 are graphs useful in understanding the operation of the apparatus depicted by the other figures.

In both FIGS. 3 and 5, the sound frequency is increasing with the passage of time during each scanning period as depicted in FIG. 4. In FIG. 3, the light wavefronts encounter advancing sound wave-fronts and the light diffracted by the sound waves is converged and deflected with a component of motion in the direction of sound wave propagation. The direction of motion is indicated in the drawing by the curved arrows. On the other hand, in FIG. 5 the light wave-fronts encounter departing sound wave-fronts as a result of which the light diffracted by the sound waves is diverged and deflected with a component of motion opposite to the direction of sound wave propagation.

Figure 7:
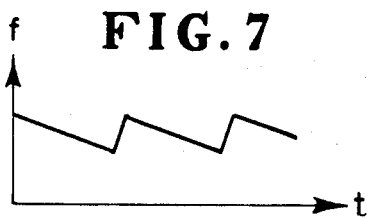
Figure 6:
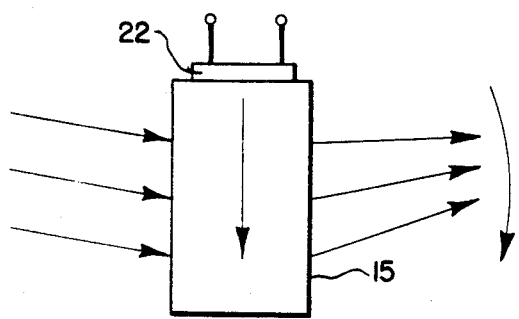
Figure 8:
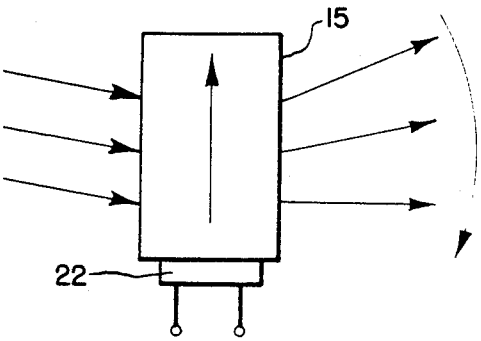

In the combinations of FIGS. 6 and 8, the sound frequency decreases with time during each scanning period as shown in FIG. 7. Consequeuntly, in FIG. 6 the light wave-fronts encounter departing sound wave-fronts as a result of which light diffracted by the sound waves is converged and deflected with a component of motion in the direction of sound wave propagation. In FIG. 8 the light wave-fronts encounter advancing sound wave-fronts whereupon the light diffracted by the sound waves is diverged and deflected with a component of motion opposite to the direction of sound wave propagation.

It will be observed that in each of FIGS. 3, 5, 6 and 8 the direction of light beam deflection is the same with the arrangements as illustrated in the drawings. For deflection in the opposite direction during the scanning period, the systems simply are inverted.

Another approach to compensation of the inherent refractive action of the light-sound cell itself in any of FIGS. 2, 3, 5, 6 and 8 involves the utilization of a second light-sound interaction cell so arranged as to have a refractive power which is complementary to the refractive power of the first. That is, the compensating refractive means also directs sound waves across a portion of the path of the light beam and the freqeuncy of both these sound waves changes across the width of the beam.

Figure 9:
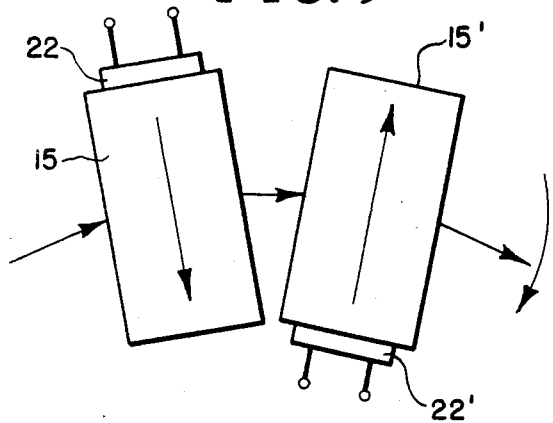
FIGS. 9 and 10 represent embodiments alternative to the embodiment of FIG. 2.

As illustrated in FIG. 9, both cells 15 and 15', spaced successively along the light beam path, are driven with sound signals the frequencies of which increase with time during the scanning period. However, the two cells individually are oriented so that the sound waves traverse the light beam in opposite directions. In this embodiment, the cells are oriented relative to one another so that the propagation directions of the sound waves form an angle approximately equal to twice the complement of the Bragg angle $\theta$ corresponding to the average frequency of the light and sound or equal to twice the entrance angle $\Theta/2$ denoted in FIG. 2. In this case, the sound waves preferably are derived from a common scanning freqeuncy source.

Figure 10:
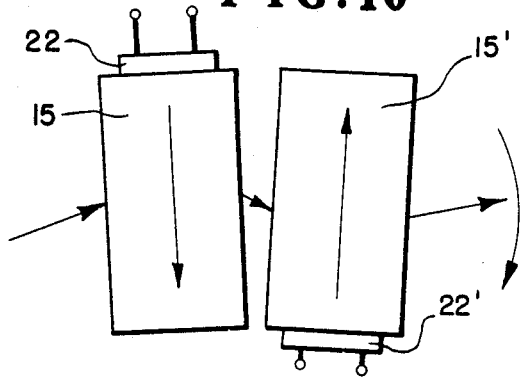

In the embodiment illustrated in FIG. 10, the transducer 22′ driving the second or downstream cell 15′ is driven by sound energy the frequency of which changes with the passage of time in a direction opposite that of the sound energy applied to the transducer of the other cell 15. Additionally, the sound waves individually traverse the light beam in opposite directions. In one arrangement, the propagation directions of the sound waves in the two different cells 15 and 15′ are approximately parallel; this condition is most satisfactory when the respective frequencies driving the two different cells are sufficiently close so that they cross over during a scanning period.

Alternatively, when the freqeuncy selection is such that the respective frequencies of the two sound waves do not cross over during scanning, one of the sound waves preferably is obtained from the other by a heterodyning process. With this arrangement, the lower-frequency one of the sound waves preferably is selected to traverse the light beam downstream from the other in order to take advantage of the greater tolerance of entrance angle attainable at lower frequencies. Also with this arrangement, the propagation directions of the sound waves are preferably oriented so as to form an angle in accordance with the Bragg relationship corresponding to the center freqeuncies of the respective frequency ranges over which the sound frequencies are scanned.

It will be observed that the combination in FIG. 9 is that of the cells individually depicted in FIGS. 3 and 5; a combination of the cells in FIGS. 6 and 8 would function in exactly the same manner. Similarly, FIG. 10 represents a combination of the individual transducers depicted in FIGS. 3 and 8 but the combination of FIGS. 6 and 5 would operate in the same way. With all of these combinations, the astigmatism created by the first cell is cancelled by the second, at least to the first order, and the resultant beam deflection is doubled.

It has thus been shown that a wide aperture advantageously may be utilized in a practical light beam deflection system. With linear scanning of the sound frequency, the linear variation of the Bragg angle across the wide aperture is equivalent to a simple convergent or divergent cylinder lens and the latter may be compensated either by optics or by a second compensatory light-sound interaction element.

A portion of the subject matter disclosed hereinbefore, including that specifically embodied and discussed with respect to FIGS. 9 and 10, is also described and claimed in copending continuation-in-part application Ser. No. 737,492, filed June 17, 1968, and assigned to the same assignee.

While particular embodiments of the present invention have been shown and described, it will be obvious to those skilled in the art that changes and modifications may be made without departing from the invention in its broader aspects. Accordingly, the aim in the appended claim is to cover all such changes and modifications as fall within the true spirit and scope of the invention.

I claim:
1. An optical scanning system for translating an image composed of a plurality of minimum-resolvable picture elements each of a predetermined time duration, which system comprises:

a Bragg diffraction light-sound interaction cell comprising a transducer coupled to a transparent acoustic wave propagating medium having an acoustic wave propagation velocity corresponding to a predetermined propagation distance in said medium in the predetermined time duration of each picture element;

means for driving said transducer with a scanning signal whose frequency varies linearly with time within a predetermined frequency range to generate acoustic waves in said medium;

means for projecting through said medium in a direction transverse to the direction of acoustic wave propagation therein and at an angle of incidence to be subjected to Bragg diffraction by said acoustic waves, a substantially parallel substantially monochromatic light beam of a width large relative to said predetermined propagation distance for each picture element, whereby said light beam is caused to scan in a particular scanning plane;

and a cylindrical optical lens in the path of said light beam with its optical axis orthogonal to said scanning plane for compensating astigmatic distortion of said beam by said acoustic waves in said Bragg diffraction cell.

References Cited
UNITED STATES PATENTS 2,155,569    4/1939    Jeffree _____ 350—161
3,055,258    9/1962    Hurvitz _____ 332—7.51

ALFRED L. BRODY, Primary Examiner

D. R. HOSTETTER, Assistant Examiner

U.S. Cl. X.R.

178—7.6